United States Patent
Murakami et al.

(10) Patent No.: US 10,669,426 B2
(45) Date of Patent: Jun. 2, 2020

(54) INORGANIC OXIDE MICROPARTICLES HAVING AMPHIPHILIC ORGANIC SILANE COMPOUND BONDED THERETO, ORGANIC SOLVENT DISPERSION THEREOF, AND COMPOSITION FOR FILM FORMATION

(71) Applicant: NISSAN CHEMICAL INDUSTRIES, LTD., Tokyo (JP)

(72) Inventors: Natsumi Murakami, Sodegaura (JP); Tomoki Furukawa, Sodegaura (JP); Yoshinari Koyama, Sodegaura (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 55 days.

(21) Appl. No.: 16/090,081

(22) PCT Filed: Mar. 24, 2017

(86) PCT No.: PCT/JP2017/012159
§ 371 (c)(1),
(2) Date: Sep. 28, 2018

(87) PCT Pub. No.: WO2017/170275
PCT Pub. Date: Oct. 5, 2017

(65) Prior Publication Data
US 2019/0185678 A1    Jun. 20, 2019

(30) Foreign Application Priority Data

Mar. 31, 2016 (JP) ................. 2016-073599

(51) Int. Cl.
| | | |
|---|---|---|
| C09C 3/12 | (2006.01) | |
| C01G 23/04 | (2006.01) | |
| C09D 201/00 | (2006.01) | |
| C09D 183/04 | (2006.01) | |
| C09D 7/40 | (2018.01) | |
| C09C 1/00 | (2006.01) | |
| C09C 3/00 | (2006.01) | |
| C09D 7/62 | (2018.01) | |
| C09C 1/36 | (2006.01) | |
| C09C 3/06 | (2006.01) | |
| C09D 5/00 | (2006.01) | |
| C09D 17/00 | (2006.01) | |
| C09D 135/02 | (2006.01) | |

(Continued)

(52) U.S. Cl.
CPC ............. C09C 3/12 (2013.01); C01G 23/04 (2013.01); C09C 1/0081 (2013.01); C09C 1/3661 (2013.01); C09C 1/3684 (2013.01); C09C 3/006 (2013.01); C09C 3/063 (2013.01); C09D 5/006 (2013.01); C09D 7/40 (2018.01); C09D 7/62 (2018.01); C09D 17/002 (2013.01); C09D 17/007 (2013.01); C09D 17/008 (2013.01); C09D 135/02 (2013.01); C09D 183/04 (2013.01); C09D 183/06 (2013.01); C09D 201/00 (2013.01); C01P 2004/64 (2013.01); C01P 2004/84 (2013.01); C01P 2006/22 (2013.01); C09C 1/3045 (2013.01); C09C 1/3054 (2013.01); C09C 1/3081 (2013.01); C09C 1/3653 (2013.01); C09C 2200/1004 (2013.01); C09C 2200/1037 (2013.01)

(58) Field of Classification Search
CPC ......... C09C 3/006; C09C 3/12; C09C 1/3648; C09C 1/3653; C09C 1/3045; C09C 1/3054; C09C 1/3081
See application file for complete search history.

(56) References Cited

U.S. PATENT DOCUMENTS

| 6,696,148 B1 | 2/2004 | Seino et al. |
|---|---|---|
| 8,883,903 B2 | 11/2014 | Gonen Williams et al. |

(Continued)

FOREIGN PATENT DOCUMENTS

| EP | 1041404 A2 | 10/2000 |
|---|---|---|
| EP | 2213623 A1 | 8/2010 |

(Continued)

OTHER PUBLICATIONS

"Surface Modification of gamma-Fe2O3@SiO2 Magnetic Naoparticles for the Controlled Interaction with Biomolecules" authored by De Palma et al. and published in the Journal of Nanoscience and Nanotechnology (2007) 7, 4626-4641.*
Jun. 20, 2017, International Search Report issued in International Patent Application No. PCT/JP2017/012159.
Jun. 20, 2017 Written Opinion of the International Searching Authority issued in International Patent Application No. PCT/JP2017/012159.
Dec. 12, 2019 European Search Report issued in European Patent Application No. 17774812.6.

Primary Examiner — Marc S Zimmer
(74) Attorney, Agent, or Firm — Oliff PLC

(57) ABSTRACT

A dispersion that inorganic oxide microparticles may be dispersed at a high concentration in a solvent, a composition for film formation having high transparency, high refractive index and adhesion to a base layer. Inorganic oxide microparticles wherein an amphiphilic organosilicon compound having one or more selected from a polyoxyethylene group, a polyoxypropylene group, or a polyoxybutylene group as a hydrophilic group, and one or more selected from a $C_{1\text{-}18}$ alkylene group or a vinylene group as a hydrophobic group bonded to a surface of modified metal oxide colloidal particles (C) having a primary particle diameter of 2 to 100 nm, the modified metal oxide colloidal particles wherein a surface of metal oxide colloidal particles (A) having a primary particle diameter of 2 to 60 nm as a nucleus is coated with a coating material (B) including metal oxide colloidal particles having a primary particle diameter of 1 to 4 nm.

10 Claims, No Drawings

(51) Int. Cl.
*C09D 183/06* (2006.01)
*C09C 1/30* (2006.01)

(56) References Cited

U.S. PATENT DOCUMENTS

| | | | |
|---|---|---|---|
| 8,920,675 | B2 | 12/2014 | Xu et al. |
| 2004/0179800 | A1* | 9/2004 | Walker, Jr. ............ C03C 25/104 |
| | | | 385/128 |
| 2012/0088845 | A1 | 4/2012 | Gonen Williams et al. |
| 2012/0313056 | A1* | 12/2012 | Baran ...................... H01B 1/22 |
| | | | 252/519.21 |
| 2012/0316266 | A1 | 12/2012 | Koyama et al. |
| 2014/0199554 | A1 | 7/2014 | Koyama et al. |
| 2014/0295649 | A1 | 10/2014 | Gonen Williams et al. |
| 2014/0302664 | A1 | 10/2014 | Gonen Williams et al. |
| 2015/0203989 | A1 | 7/2015 | Xu et al. |
| 2015/0274938 | A1* | 10/2015 | Okawa ................... C08L 83/00 |
| | | | 257/100 |
| 2016/0136307 | A1* | 5/2016 | Wei ................... A61K 49/1839 |
| | | | 424/9.323 |
| 2016/0203981 | A1 | 7/2016 | Gonen Williams et al. |
| 2016/0237299 | A1* | 8/2016 | Jing ...................... C08K 5/3412 |
| 2017/0044687 | A1 | 2/2017 | Xu et al. |
| 2018/0105714 | A1* | 4/2018 | Kasperchik ............ C09D 11/54 |
| 2018/0147777 | A1* | 5/2018 | Abbott, Jr. ............. B33Y 70/00 |

FOREIGN PATENT DOCUMENTS

| | | |
|---|---|---|
| EP | 2308803 A1 | 4/2011 |
| EP | 2527293 A1 | 11/2012 |
| EP | 2724984 A1 | 4/2014 |
| JP | H3-258866 A | 11/1991 |
| JP | H11-343349 A | 12/1999 |
| JP | 2003-73564 A | 3/2003 |
| JP | 2004-300312 A | 10/2004 |
| JP | 4273942 B2 | 6/2009 |
| JP | 2014-503446 A | 2/2014 |
| JP | 2015-182938 A | 10/2015 |
| WO | 2011/090084 A1 | 7/2011 |
| WO | 2011/133228 A2 | 10/2011 |
| WO | 2012/058271 A2 | 5/2012 |
| WO | 2012/165620 A1 | 12/2012 |

* cited by examiner

INORGANIC OXIDE MICROPARTICLES HAVING AMPHIPHILIC ORGANIC SILANE COMPOUND BONDED THERETO, ORGANIC SOLVENT DISPERSION THEREOF, AND COMPOSITION FOR FILM FORMATION

TECHNICAL FIELD

The present invention relates to inorganic oxide microparticles in which an amphiphilic organic silane compound is bonded to a surface of modified metal oxide colloidal particles, an organic solvent dispersion of the inorganic oxide microparticles, a composition for film formation containing the inorganic oxide microparticles, and a member having a cured film of the composition for film formation.

BACKGROUND ART

In recent years, optical materials have been actively studied. In particular, development of a material having high refractive index, low dispersibility (high Abbe number), and excellent heat resistance, transparency, easy moldability, low weight, chemical resistance, weather resistance, and scratch resistance is required in a lens material field.

A plastic lens is easily scratched, but is light, is unlikely to be cracked, and is easily processed, as compared with an inorganic material such as glass. Therefore, the use of the plastic lens spreads for not only a lens for glasses but also optical materials including a lens for a portable camera, a pickup lens and so on.

In a conventional optical member, the mechanical properties of a resin are improved by mixing an inorganic oxide filler such as silica with the resin (for example, see Patent Literature 1), and the scratch resistance is improved by layering a hard coat film containing inorganic oxide microparticles on a surface of the optical member (for example, see Patent Literature 2).

Due to a decrease in size of an electronic apparatus equipped with an optical member, a decrease in thickness of the lens is required, and an increase in refractive index of a material is required. The refractive index of the optical member is increased by mixing nano-level high-refractive index inorganic oxide microparticles of titanium oxide, zirconium oxide, or antimony pentoxide with a resin (for example, see Patent Literature 3).

However, during dispersion of nano-level inorganic oxide microparticles in an organic solvent, a large amount of dispersant is often contained (for example, see Patent Literature 4). In this case, bleed out during curing and coloring of a cured product may occur. This causes a decrease in refractive index. On the other hand, in a case where the dispersant is not contained or the amount of the dispersant is small, the dispersion stability of the inorganic oxide microparticles is decreased, the microparticles are aggregated in a dispersion, or a dispersion having a low solid content concentration of 15% by mass or less is only obtained (for example, see Patent Literature 5). When the microparticles are mixed with a resin and a cured product is produced, the cured product is easily clouded due to the aggregation of the microparticles, and the surface roughness is likely to be increased due to an aggregate. This causes problems in which scratch resistance and adhesion are likely to be decreased.

In order to improve the compatibility with the resin, various techniques for bonding an organic silane compound to a surface of the microparticles have been investigated. However, the surface of the microparticles is often made hydrophobic (for example, see Patent Literature 6). Therefore, a solvent in which the microparticles can be dispersed is restricted. When the surface of the microparticles is not sufficiently made hydrophobic, problems such as low compatibility with the resin and clouding of a cured film are caused.

PRIOR ART DOCUMENTS

Patent Documents

Patent Document 1: Japanese Patent Application Publication No. 11-343349 (JP 11-343349 A)
Patent Document 2: Japanese Patent Application Publication No. 2004-300312 (JP 2004-300312 A)
Patent Document 3: Japanese Patent Application Publication No. 2003-73564 (JP 2003-73564 A)
Patent Document 4: Japanese Patent No. 4273942 (JP 4273942)
Patent Document 5: Japanese Patent Application Publication No. 2015-182938 (JP 2015-182938 A)
Patent Document 6: Japanese Patent Application Publication No. 3-258866 (JP 3-258866 A)

SUMMARY OF THE INVENTION

Problem to be Solved by the Invention

A dispersion of metal oxide microparticles used for an optical member is required to have a small dispersed particle diameter, excellent dispersion stability, and excellent compatibility with a resin that is a matrix. A composition for film formation containing the metal oxide microparticles applied to the optical member is required to have high transparency, adhesion, and scratch resistance after curing.

The present invention has been made in view of the above circumstances, and an object of the present invention is to provide inorganic oxide microparticles that may be stably dispersed at a high concentration in an organic solvent, an organic solvent dispersion containing the same, and a composition for film formation capable of forming a film having high transparency, adhesion, and scratch resistance.

Means for Solving the Problems

A first aspect of the present invention is inorganic oxide microparticles in which an amphiphilic organosilicon compound having one or more selected from a polyoxyethylene group, a polyoxypropylene group, and a polyoxybutylene group as a hydrophilic group, and one or more selected from a $C_{1-18}$ alkylene group or a vinylene group as a hydrophobic group is bonded to a surface of modified metal oxide colloidal particles (C) having a primary particle diameter of 2 to 100 nm, wherein the modified metal oxide colloidal particles in which a surface of metal oxide colloidal particles (A) having a primary particle diameter of 2 to 60 nm as a nucleus is coated with a coating material (B) including metal oxide colloidal particles having a primary particle diameter of 1 to 4 nm.

A second aspect is the inorganic oxide microparticles according to the first aspect, wherein the amphiphilic organosilicon compound contains 3 to 40 mol of the hydrophilic group in one molecule thereof.

A third aspect is the inorganic oxide microparticles according to the first or second aspect, wherein the amount of the amphiphilic organosilicon compound is 0.1 to 30% by mass relative to the total amount of metal oxides of the modified metal oxide colloidal particles (C).

A fourth aspect is the inorganic oxide microparticles according to any one of the first to third aspects, wherein the metal oxide colloidal particles (A) include colloidal particles of oxide of at least one metal selected from the group consisting of Ti, Fe, Cu, Zn, Y, Zr, Nb, Mo, In, Sn, Sb, Ta, W, Pb, Bi, and Ce.

A fifth aspect is the inorganic oxide microparticles according to any one of the first to fourth aspects, wherein the coating material (B) includes colloidal particles of oxide of at least one metal selected from the group consisting of Si, Al, Sn, Zr, Mo, Sb, and W.

A sixth aspect is an organic solvent dispersion comprising the inorganic oxide microparticles according to any one of the first to fifth aspects.

A seventh aspect is a composition for film formation comprising the inorganic oxide microparticles according to any one of the first to fifth aspects, and one or more of an organosilicon compound of the following Formula (M):

(M)

(wherein $R^1$ is a $C_{1-6}$ hydrocarbon group or an organic group having a vinyl group, a methacryloxy group, an acryloxy group, a mercapto group, an amino group, an ureido group, or an epoxy group, $R^2$ is a $C_{1-10}$ hydrocarbon group different from $R^1$, $R^3$ is a $C_{1-8}$ hydrocarbon group or an acyl group, a and b each are 0 or 1), and a hydrolysate and/or a partial condensation of the organosilicon compound.

An eight aspect is a composition for film formation comprising the inorganic oxide microparticles according to any one of the first to fifth aspects, and one or more selected from the group consisting of a thermosetting resin, a thermoplastic resin, or an ultraviolet-curing resin.

A ninth aspect is a member comprising a cured film of the composition for film formation according to the seven or eight aspect on a surface of a substrate.

A tenth aspect is the member according to the ninth aspect, further comprising an anti-reflective coating on a surface thereof.

Effects of the Invention

Inorganic oxide microparticles of the present invention include an amphiphilic organosilicon compound bonded to a surface thereof. The inorganic oxide microparticles exhibit stable dispersibility at a high concentration in an organic solvent. When the inorganic oxide microparticles are mixed with a matrix component such as a resin, aggregation can be suppressed. A composition for film formation containing the inorganic oxide microparticles of the present invention and the matrix component such as a resin, can provide a cured film and an optical member that have excellent transparency, high refractive index, scratch resistance, heat resistance, and weather resistance.

An optical member having a cured film formed from a composition for formation of a transparent film of the present invention can be used for not only a lens for glasses but also a lens for a camera, a window glass for an automobile, and an optical filter provided in a liquid crystal display, a plasma display and the like.

MODES FOR CARRYING OUT THE INVENTION

In the inorganic oxide microparticles of the present invention, an amphiphilic organosilicon compound is bonded to a surface of modified metal oxide colloidal particles (C) having a primary particle diameter of 2 to 100 nm, the modified metal oxide colloidal particles in which a surface of metal oxide colloidal particles (A) having a primary particle diameter of 2 to 60 nm as a nucleus is coated with a coating material (B) including metal oxide colloidal particles having a primary particle diameter of 1 to 4 nm.

In the present invention, the primary particle diameter can be measured by a transmission electron microscope.

The metal oxide colloidal particles (A) can be produced by a known method such as an ion exchange method, a peptization method, a hydrolysis method, and a reaction method. Examples of the ion exchange method include a method for treating an acid salt of at least one metal selected from the group consisting of Ti, Fe, Cu, Zn, Zr, Nb, Mo, In, Sn, Sb, Ta, W, Pb, Bi, and Ce with a hydrogen-type ion exchange resin, and a method for treating a basic salt of the above metal with a hydroxyl group-type anion exchange resin. Examples of the peptization method include a method in which a gel obtained by neutralizing the acid salt of the metal with a base or neutralizing the basic salt of the metal with an acid is washed and peptized with an acid or a base. Examples of the hydrolysis method include a method for hydrolyzing alkoxide of the metal and a method in which the basic salt of the metal is hydrolyzed under heating and an unnecessary acid is then removed. Examples of the reaction method include a method for reacting a powder of the metal with an acid.

It is preferable that the metal oxide colloidal particles (A) be an oxide of at least one metal selected from the group consisting of Ti, Fe, Cu, Zn, Y, Zr, Nb, Mo, In, Sn, Sb, Ta, W, Pb, Bi, and Ce. The metal oxide colloidal particles (A) are an oxide of metal having a valence of 2 to 6. Examples of the metal oxide form include $TiO_2$, $Fe_2O_3$, $CuO$, $ZnO$, $Y_2O_3$, $ZrO_2$, $Nb_2O_5$, $MoO_3$, $In_2O_3$, $SnO_2$, $Sb_2O_5$, $Ta_2O_5$, $WO_3$, $PbO$, and $Bi_2O_3$. The metal oxides may be used alone or in combination. Examples of a method for combination include a method for mixing some types of the metal oxides, a method for compositing the metal oxides, and a method for converting the metal oxides into a solid solution at an atomic level.

Examples of the metal oxide colloidal particles (A) include $SnO_2$—$WO_3$ composite colloidal particles composited by chemically bonding $SnO_2$ particles and $WO_3$ particles on interfaces thereof, resulting in composite, $SnO_2$—$ZrO_2$ composite colloidal particles obtained by chemically bonding $SnO_2$ particles and $ZrO_2$ particles on interfaces thereof, resulting in composite, and $TiO_2$—$ZrO_2$—$SnO_2$ composite colloidal particles obtained by forming a solid solution at the atomic level from $TiO_2$, $ZrO_2$, and $SnO_2$.

The metal oxide colloidal particles (A) can be used as a compound depending on a combination of metal components. Examples of such metal oxide colloidal particles (A) include $ZnSb_2O_6$, $InSbO_4$, and $ZnSnO_3$.

A surface of the metal oxide colloidal particles (A) as a nucleus is coated with the coating material (B) including metal oxide colloidal particles having a primary particle diameter of 1 to 4 nm to obtain the particles (C), and the amphiphilic organosilicon compound is bonded to a surface of the particles (C). Thus, the inorganic oxide microparticles of the present invention are obtained.

It is preferable that a metal oxide used for the coating material (B) be colloidal particles of oxide of at least one metal selected from the group consisting of Si, Al, Sn, Zr, Mo, Sb, and W. Examples of the metal oxide used for the coating material (B) include $SiO_2$, $Al_2O_3$, $SnO_2$, $ZrO_2$, $MoO_3$, $Sb_2O_5$, and $WO_3$. The metal oxides may be used alone or in combination. Examples of a method for combination include a method for mixing some types of the metal oxides, a method for compositing the metal oxides, and a method in which the metal oxides are converted into a solid solution at an atomic level.

Examples of the metal oxide used for the coating material (B) include $SnO_2$—$WO_3$ composite colloidal particles composited by chemically bonding $SnO_2$ particles and $WO_3$ particles on interfaces thereof, resulting in composite, $SnO_2$—$SiO_2$ composite colloidal particles obtained by chemically bonding $SnO_2$ particles and $SiO_2$ particles on interfaces thereof, resulting in composite, $SnO_2$—$WO_3$—$SiO_2$ composite colloidal particles obtained by chemically bonding $SnO_2$ particles, $WO_3$ particles, and $SiO_2$ particles on interfaces thereof, resulting in composite, $SnO_2$—$MoO_3$—$SiO_2$ composite colloidal particles obtained by chemically bonding $SnO_2$ particles, $MoO_3$ particles, and $SiO_2$ particles on interfaces thereof, resulting in composite, and $Sb_2O_5$—$SiO_2$ composite colloidal particles obtained by chemically bonding $Sb_2O_5$ particles and $SiO_2$ particles on interfaces thereof.

The coating material (B) can be produced by a known method such as an ion exchange method and an oxidation method. Examples of the ion exchange method include a method for treating an acid salt of the metal with a hydrogen-type ion exchange resin. Examples of the oxidation method include a method for reacting a powder of the metal or an oxide of the metal with hydrogen peroxide.

Examples of a method for producing the modified metal oxide colloidal particles (C) include the following first and second methods.

The first method is a method in which an aqueous dispersion containing the metal oxide colloidal particles (A) as a nucleus and an aqueous dispersion containing the coating material (B) are mixed at a mass ratio (B)/(A) in terms of the metal oxides of 0.05 to 0.5, and then heated. For example, the aqueous dispersion containing the metal oxide colloidal particles (A) and an aqueous dispersion containing $Sb_2O_5$—$SiO_2$ composite colloidal particles at a mass ratio $Sb_2O_5/SiO_2$ of 0.1 to 5, as the coating material (B), are mixed at a mass ratio (B)/(A) of 0.05 to 0.5, and then heated at 70 to 350° C., to obtain an aqueous dispersion of the modified metal oxide colloidal particles (C) in which a surface of the metal oxide colloidal particles (A) as the nucleus is coated with the $Sb_2O_5$—$SiO_2$ composite colloidal particles.

The second method is a method in which the aqueous dispersion containing the metal oxide colloidal particles (A) as a nucleus and a water-soluble alkali salt of tin oxide and an alkali salt of silicon oxide as the coating material (B) are mixed at a mass ratio $SnO_2/SiO_2$ in terms of metal oxides of 0.1 to 5, and alkali metal ions are then removed by cationic exchange. As an aqueous solution of the water-soluble alkali salt used in the second method, an aqueous solution of sodium salt can be preferably used. For example, the aqueous dispersion containing the metal oxide colloidal particles (A) and an aqueous dispersion of $SnO_2$—$SiO_2$ composite colloidal particles as the coating material (B) obtained by mixing an aqueous solution of sodium stannate and an aqueous solution of sodium silicate followed by cationic exchange are mixed at a mass ratio $(SnO_2$—$SiO_2)/(A)$ of 0.05 to 0.5, and then heated at 70 to 350° C., to obtain an aqueous dispersion of the modified metal oxide colloidal particles (C) in which a surface of the metal oxide colloidal particles (A) as a nucleus is coated with the coating material (B) including the $SnO_2$—$SiO_2$ composite colloidal particles.

The metal oxide colloidal particles (A) and the coating material (B) can be mixed at 1 to 100° C., and preferably at room temperature to 60° C. After the mixing, heating is performed preferably at 70 to 350° C.

The aqueous dispersion of the modified metal oxide colloidal particles (C) may further contain an optional component as long as the object of the present invention is achieved. When oxycarboxylic acids are contained in an amount of about 30% by mass or less relative to the total amount of metal oxides of the modified metal oxide colloidal particles (C), a colloid having further improved performances such as dispersibility is obtained. Examples of oxycarboxylic acid used include lactic acid, tartaric acid, citric acid, gluconic acid, malic acid, and glycol.

The dispersion of the modified metal oxide colloidal particles (C) may contain an alkaline component. Examples thereof include hydroxides of alkali metals such as Li, Na, K, Rb, and Cs, ammonia, primary to tertiary alkylamines such as ethylamine, isopropylamine, n-propylamine, n-butylamine, diethylamine, di-n-propylamine, diisopropylamine, di-n-butylamine, diisobutylamine, triethylamine, tripropylamine, tributylamine, triisobutylamine, triamylamine, tri-n-hexylamine, tri-n-octylamine, dimethylpropylamine, dimethylbutylamine, and dimethylhexylamine, aralkylamines such as benzylamine and dimethylbenzylamine, alicyclic amines such as piperidine, alkanolamines such as monoethanolamine and triethanolamine, and quaternary ammonium salts such as tetramethylammonium hydroxide, tetraethylammonium hydroxide, and tetrapropylammonium hydroxide. The dispersions may contain a mixture of two or more types of the alkaline components. The alkaline components may be contained in an amount of about 30% by mass or less relative to the total amount of metal oxides of the modified metal oxide colloidal particles (C). Further, the oxycarboxylic acid may be simultaneously used.

In order to further increase the concentration of aqueous dispersion of the modified metal oxide, the aqueous dispersion may be concentrated up to about 65% by mass by an ordinary method such as a vaporization method and an ultrafiltration method. The pH of the aqueous dispersion can be adjusted by adding the alkaline metal hydroxide, amine, a quaternary ammonium salt, oxycarboxylic acid, or the like to the aqueous dispersion. The total concentration of metal oxides of the modified metal oxide colloidal particles (C) is 10 to 60% by mass, and preferably 30 to 50% by mass.

An aqueous medium of the aqueous dispersion of the modified metal oxide colloidal particles (C) is replaced by a hydrophilic organic solvent to obtain an organic solvent dispersion. This replacement can be performed by a typical method such as an distillation method and an ultrafiltration method. Examples of the hydrophilic organic solvent include lower alcohols such as methanol, ethanol, isopropanol, and 1-propanol, ethers such as propylene glycol monomethyl ether, linear amides such as dimethyl formamide and N, N'-dimethylacetamide, cyclic amides such as N-methyl-2-pyrrolidone, and glycols such as ethyl cellosolve and ethylene glycol.

In the inorganic oxide microparticles of the present invention, an amphiphilic organosilicon compound having one or more selected from a polyoxyethylene group, a polyoxypropylene group, or a polyoxybutylene group as a hydrophilic group, and one or more selected from a $C_{1-18}$ alkylene group or a vinylene group as a hydrophobic group is bonded to the surface of the modified metal oxide colloidal particles (C).

It is preferable that the amphiphilic organosilicon compound contain 3 to 40 mol of the polyoxyethylene group, polyoxypropylene group, or polyoxybutylene group that is the hydrophilic group in one molecule thereof.

Examples of the $C_{1-18}$ alkylene group as the hydrophobic group include methylene group, ethylene group, n-propylene group, isopropylene group, cyclopropylene group, n-butylene group, isobutylene group, s-butylene group, t-butylene group, cyclobutylene group, 1-methyl-cyclopropylene group, 2-methyl-cyclopropylene group, n-pentylene group, 1-methyl-n-butylene group, 2-methyl-n-butylene group, 3-methyl-n-butylene group, 1,1-dimethyl-n-propylene group, 1,2-dimethyl-n-propylene group, 2,2-dimethyl-n-propylene group, 1-ethyl-n-propylene group, cyclopentylene group, 1-methyl-cyclobutylene group, 2-methyl-cyclobutylene group, 3-methyl-cyclobutylene group, 1,2-dimethyl-cyclopropylene group, 2,3-dimethyl-cyclopropylene group, 1-ethyl-cyclopropylene group, 2-ethyl-cyclopropylene group, n-hexylene group, 1-methyl-n-pentylene group, 2-methyl-n-pentylene group, 3-methyl-n-pentylene group, 4-methyl-n-pentylene group, 1,1-dimethyl-n-butylene group, 1,2-dimethyl-n-butylene group, 1,3-dimethyl-n-butylene group, 2,2-dimethyl-n-butylene group, 2,3-dimethyl-n-butylene group, 3,3-dimethyl-n-butylene group, 1-ethyl-n-butylene group, 2-ethyl-n-butylene group, 1,1,2-trimethyl-n-propylene group, 1,2,2-trimethyl-n-propylene group, 1-ethyl-1-methyl-n-propylene group, 1-ethyl-2-methyl-n-propylene group, n-heptylene group, n-octylene group, n-nonylene group, cyclohexylene group, 1-methyl-cyclopentylene group, 2-methyl-cyclopentylene group, 3-methyl-cyclopentylene group, 1-ethyl-cyclobutylene group, 2-ethyl-cyclobutylene group, 3-ethyl-cyclobutylene group, 1,2-dimethyl-cyclobutylene group, 1,3-dimethyl-cyclobutylene group, 2,2-dimethyl-cyclobutylene group, 2,3-dimethyl-cyclobutylene group, 2,4-dimethyl-cyclobutylene group, 3,3-dimethyl-cyclobutylene group, 1-n-propyl-cyclopropylene group, 2-n-propyl-cyclopropylene group, 1-isopropyl-cyclopropylene group, 2-isopropyl-cyclopropylene group, 1,2,2-trimethyl-cyclopropylene group, 1,2,3-trimethyl-cyclopropylene group, 2,2,3-trimethyl-cyclopropylene group, 1-ethyl-2-methyl-cyclopropylene group, 2-ethyl-1-methyl-cyclopropylene group, 2-ethyl-2-methyl-cyclopropylene group, and 2-ethyl-3-methyl-cyclopropylene group.

Specific examples of the amphiphilic organosilicon compound used in the present invention include methoxytriethyleneoxypropyltrimethoxysilane, methoxytriethyleneoxyoctyltrimethoxysilane, methoxytriethyleneoxypropyltriethoxysilane, methoxytriethyleneoxypropyltripropoxysilane, methoxytriethyleneoxypropyltriacetoxysilane, methoxytripropyleneoxypropyltrimethoxysilane, methoxytripropyleneoxyoctyltrimethoxysilane, methoxytripropyleneoxypropyltriethoxysilane, methoxytripropyleneoxypropyltripropoxysilane, methoxytripropyleneoxypropyltriacetoxysilane, methoxytributyleneoxypropyltrimethoxysilane, methoxytributyleneoxyoctyltrimethoxysilane, methoxytributyleneoxypropyltriethoxysilane, methoxytributyleneoxypropyltripropoxysilane, methoxytributyleneoxypropyltriacetoxysilane, methoxytriethylenepropyldimethoxymethylsilane, methoxytripropyleneoxydimethoxymethylsilane, methoxytributyleneoxydimethoxymethylsilane, methoxytriethylenepropyldiethoxymethylsilane, methoxytripropyleneoxydiethoxymethylsilane, methoxytributyleneoxydiethoxymethylsilane, methoxytriethylenepropyldimethylmethoxysilane, methoxytripropyelenepropyldimethylmethoxysilane, methoxytributylenepropyldimethylmethoxysilane, methoxytriethylenepropyldimethylethoxysilane, methoxytripropyelenepropyldimethylethoxysilane, methoxytributylenepropyldimethylethoxysilane, bis-(methoxytriethylenepropyl)dimethoxysilane, bis-(methoxytripropyelenepropyl)dimethoxysilane, bis-(methoxytributylenepropyl)dimethoxysilane, [methoxy(polyethyleneoxy)$_n$propyl]trimethoxysilane, [methoxy(polyethyleneoxy)$_n$propyl]triethoxysilane, [methoxy(polyethyleneoxy)$_n$propyl]tripropoxysilane, [methoxy(polyethyleneoxy)$_n$propyl]triacetoxysilane, [methoxy(polypropyleneoxy)$_n$propyl]trimethoxysilane, [methoxy(polypropyleneoxy)$_n$propyl]triethoxysilane, [methoxy(polypropyleneoxy)$_n$propyl]tripropoxysilane, [methoxy(polypropyleneoxy)$_n$propyl]triacetoxysilane, [methoxy(polybutyleneoxy)$_n$propyl]trimethoxysilane, [methoxy(polybutyleneoxy)$_n$propyl]tripropoxysilane, [methoxy(polybutyleneoxy)$_n$propyl]triacetoxysilane, [methoxy(polyethyleneoxy)$_n$propyl]dimethoxymethylsilane, [methoxy(polyethyleneoxy)$_n$propyl]diethoxymethylsilane, [methoxy(polyethyleneoxy)$_n$propyl]dipropoxymethylsilane, [methoxy(polyethyleneoxy)$_n$propyl]diacetoxymethylsilane, [methoxy(polypropyleneoxy)$_n$propyl]dimethoxymethylsilane, [methoxy(polypropyleneoxy)$_n$propyl]diethoxymethylsilane, [methoxy(polypropyleneoxy)$_n$propyl]dipropoxymethylsilane, [methoxy(polypropyleneoxy)$_n$propyl]diacetoxymethylsilane, [methoxy(polybutyleneoxy)$_n$propyl]dimethoxymethylsilane, [methoxy(polybutyleneoxy)$_n$propyl]diethoxymethylsilane, [methoxy(polybutyleneoxy)$_n$propyl]dipropoxymethylsilane, and [methoxy(polybutyleneoxy)$_n$propyl]diacetoxymethylsilane.

The amount of the amphiphilic organosilicon compound bonded to the surface of the modified metal oxide colloidal particles (C) is preferably 0.1 to 30% by mass, and more preferably 1 to 15% by mass, relative to the total amount of metal oxides of the modified metal oxide colloidal particles (C).

A predetermined amount of the amphiphilic organosilicon compound is added to the aqueous dispersion or hydrophilic organic solvent dispersion of the modified metal oxide colloidal particles (C), and the organosilicon compound is hydrolyzed with a catalyst such as dilute hydrochloric acid to bond the organosilicon compound to the surface of the modified metal oxide colloidal particles (C). Thus, the inorganic oxide microparticles of the present invention can be obtained.

An aqueous dispersion or hydrophilic organic solvent dispersion of the inorganic oxide microparticles of the present invention can be further replaced by a hydrophobic organic solvent. This replacement can be performed by a typical method such as a distillation method and an ultrafiltration method. Examples of the hydrophobic solvent include ketones such as methyl ethyl ketone and methyl isobutyl ketone, cyclic ketones such as cyclopentanone and cyclohexanone, and esters such as ethyl acetate and butyl acetate.

The organic solvent dispersion of the inorganic oxide microparticles of the present invention may contain another optional component as long as the object of the present invention is achieved. When phosphoric acid, a phosphoric acid derivative, a phosphoric acid-based surfactant, oxycarboxylic acid, or the like is contained in an amount of about 30% by mass or less relative to the total amount of metal oxides, a dispersion having further improved dispersibility is obtained.

Examples of the phosphoric acid derivative used include phenylphosphonic acid and a metal salt thereof. Examples of the phosphoric acid-based surfactant include Disperbyk (BYK), Phosphanol (TOHO Chemical Industry Co., Ltd.), and NIKKOL (Nikko Chemicals Co., Ltd.). Examples of oxycarboxylic acid include lactic acid, tartaric acid, citric acid, gluconic acid, malic acid, and glycol.

The total concentration of metal oxides in the organic solvent dispersion containing the inorganic oxide microparticles of the present invention is 10 to 60% by mass, and preferably 30 to 50% by mass. The dispersed particle diameter measured by a dynamic light scattering method is 5 to 40 nm and the organic solvent dispersion has excellent dispersion stability.

A matrix component used for the composition for film formation of the present invention is one or more of an organosilicon compound of the following Formula (M):

$$R^1_a R^2_b Si(OR^3)_{4-(a+b)} \quad (M)$$

(wherein $R^1$ is a $C_{1-6}$ hydrocarbon group or an organic group having a vinyl group, a methacryloxy group, an acryloxy group, a mercapto group, an amino group, an ureido group, or an epoxy group, $R^2$ is a $C_{1-10}$ hydrocarbon group different from $R^1$, $R^3$ is a $C_{1-8}$ hydrocarbon group or an acyl group, and a and b are 0 or 1), and a hydrolysate and/or a partial condensation of the organosilicon compound.

Examples of the $C_{1-6}$ hydrocarbon group in the definition of $R^1$, the $C_{1-10}$ hydrocarbon group in the definition of $R^2$, and the $C_{1-3}$ hydrocarbon group in the definition of $R^3$ include an alkyl group, an aryl group, a halogenated alkyl group, a halogenated aryl group, and an alkenyl group that each have corresponding carbon atom number.

Examples of the alkyl group include linear and branch alkyl groups. Examples thereof include methyl group, ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, n-heptyl group, n-octyl group, n-nonyl group, and n-decyl group.

Further, a cyclic alkyl group may be used. Examples thereof include cyclopropyl group, cyclobutyl group, 1-methyl-cyclopropyl group, 2-methyl-cyclopropyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, 2-ethyl-3-methyl-cyclopropyl group, adamantane group, norbornene group, and norbornane group.

Examples of the aryl group include phenyl group, o-methylphenyl group, m-methylphenyl group, p-methylphenyl group, o-chlorophenyl group, m-chlorophenyl group, p-chlorophenyl group, o-fluorophenyl group, p-mercaptophenyl group, o-methoxyphenyl group, p-methoxyphenyl group, p-aminophenyl group, p-cyanophenyl group, α-naphthyl group, and β-naphthyl group.

Examples of the halogenated alkyl group include alkyl groups in which the alkyl groups exemplified above are substituted with a halogen group. Examples of the halogenated aryl group include aryl groups in which the aryl groups exemplified above are substituted with a halogen group. Examples of the halogen group include fluorine, chlorine, bromine, and iodine groups.

Examples of the alkenyl group include a $C_{2-10}$ alkenyl group. Examples thereof include ethenyl group, 1-propenyl group, 2-propenyl group, 1-methyl-1-ethenyl group, 1-butenyl group, 2-butenyl group, 3-butenyl group, 2-methyl-1-propenyl group, 2-methyl-2-propenyl group, 1-ethylethenyl group, 1-methyl-1-propenyl group, 1-methyl-2-propenyl group, 1-pentenyl group, 2-pentenyl group, 3-pentenyl group, 4-pentenyl group, 1-n-propylethenyl group, 1-methyl-1-butenyl group, 1-methyl-2-butenyl group, 1-methyl-3-butenyl group, 2-ethyl-2-propenyl group, 2-methyl-1-butenyl group, 2-methyl-2-butenyl group, 2-methyl-3-butenyl group, 3-methyl-1-butenyl group, 3-methyl-2-butenyl group, 3-methyl-3-butenyl group, 1,1-dimethyl-2-propenyl group, 1-i-propylethenyl group, 1,2-dimethyl-1-propenyl group, 1,2-dimethyl-2-propenyl group, 1-cyclopentenyl group, 2-cyclopentenyl group, 3-cyclopentenyl group, 1-hexenyl group, 2-hexenyl group, 3-hexenyl group, 4-hexenyl group, 5-hexenyl group, 1-methyl-1-pentenyl group, 1-methyl-2-pentenyl group, 1-methyl-3-pentenyl group, 1-methyl-4-pentenyl group, 1-n-butylethenyl group, 2-methyl-1-pentenyl group, 2-methyl-2-pentenyl group, 2-methyl-3-pentenyl group, 2-methyl-4-pentenyl group, 2-n-propyl-2-propenyl group, 3-methyl-1-pentenyl group, 3-methyl-2-pentenyl group, 3-methyl-3-pentenyl group, 3-methyl-4-pentenyl group, 3-ethyl-3-butenyl group, 4-methyl-1-pentenyl group, 4-methyl-2-pentenyl group, 4-methyl-3-pentenyl group, 4-methyl-4-pentenyl group, 1,1-dimethyl-2-butenyl group, 1,1-dimethyl-3-butenyl group, 1,2-dimethyl-1-butenyl group, 1,2-dimethyl-2-butenyl group, 1,2-dimethyl-3-butenyl group, 1-methyl-2-ethyl-2-propenyl group, 1-s-butylethenyl group, 1,3-dimethyl-1-butenyl group, 1,3-dimethyl-2-butenyl group, 1,3-dimethyl-3-butenyl group, 1-i-butylethenyl group, 2,2-dimethyl-3-butenyl group, 2,3-dimethyl-1-butenyl group, 2,3-dimethyl-2-butenyl group, 2,3-dimethyl-3-butenyl group, 2-i-propyl-2-propenyl group, 3,3-dimethyl-1-butenyl group, 1-ethyl-1-butenyl group, 1-ethyl-2-butenyl group, 1-ethyl-3-butenyl group, 1-n-propyl-1-propenyl group, 1-n-propyl-2-propenyl group, 2-ethyl-1-butenyl group, 2-ethyl-2-butenyl group, 2-ethyl-3-butenyl group, 1,1,2-trimethyl-2-propenyl group, 1-t-butylethenyl group, 1-methyl-1-ethyl-2-propenyl group, 1-ethyl-2-methyl-1-propenyl group, 1-ethyl-2-methyl-2-propenyl group, 1-i-propyl-1-propenyl group, 1-i-propyl-2-propenyl group, 1-methyl-2-cyclopentenyl group, 1-methyl-3-cyclopentenyl group, 2-methyl-1-cyclopentenyl group, 2-methyl-2-cyclopentenyl group, 2-methyl-3-cyclopentenyl group, 2-methyl-4-cyclopentenyl group, 2-methyl-5-cyclopentenyl group, 2-methylene-cyclopentyl group, 3-methyl-1-cyclopentenyl group, 3-methyl-2-cyclopentenyl group, 3-methyl-3-cyclopentenyl group, 3-methyl-4-cyclopentenyl group, 3-methyl-5-cyclopentenyl group, 3-methylene-cyclopentyl group, 1-cyclohexenyl group, 2-cyclohexenyl group, and 3-cyclohexenyl group.

Examples of the organic group having a vinyl group include methylvinyl group, ethylvinyl group, and propylvinyl group.

Examples of the organic group having a methacryloxy group include methacryloxymethyl group, methacryloxyethyl group, methacryloxypropyl group, and methacryloxyoctyl group.

Examples of the organic group having an acryloxy group include acryloxymethyl group, acryloxyethyl group, acryloxypropyl group, and acryloxyoctyl group.

Examples of the organic group having a mercapto group include ethylmercapto group, propylmercapto group, butylmercapto group, hexylmercapto group, and octylmercapto group.

Examples of the organic group having an amino group include amino group, aminomethyl group, aminoethyl group, aminopropyl group, aminohexyl group, and aminoctyl group.

Examples of the organic group having an ureido group include ureidoethyl group, ureidopropyl group, ureidobutyl group, ureidohexyl group, and ureidooctyl group.

Examples of the organic group having an epoxy group include glycidoxymethyl group, glycidoxyethyl group, glycidoxypropyl group, glycidoxybutyl group, glycidoxyoctyl group, and epoxycyclohexyl group.

Specific examples of the acyl group include formyl group, acetyl group, propionyl group, butyryl group, and isobutyryl group.

Examples of the organosilicon compound of Formula (M) include tetramethoxysilane, tetraethoxysilane, tetra n-propoxysilane, tetraisopropoxysilane, tetra n-butoxysilane, tetraacetoxysilane, methyltrimethoxysilane, methyltriethoxysilane, methyltripropoxysilane, methyltriacetoxysilane, methyltributoxysilane, methyltriamiloxysilane, methyltriphenoxysilane, methyltribenzyloxysilane, methyltriphenethyloxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glyeidoxybutyltriethoxysilane, γ-glycidoxybutyltrimethoxysilane, γ-glycidoxybutyltriethoxysilane, δ-glyeidoxybutyltrimethoxysilane, β-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl) ethyltrimethoxysilane, β-(3,4-epoxycyclohexy) ethyltriethoxysilane, β-(3,4-epoxycyclohexyl) ethyltripropoxysilane, β-(3,4-epoxycyclohexy) ethyltributoxysilane, β-(3,4-epoxycyclohexyl) ethyltriphenoxysilane, γ-(3,4-epoxycyclohexyl) propyltrimethoxysilane, γ-(3,4-epoxycyclohexyl) propyltriethoxysilane, δ-(3,4-epoxycyclohexyl) butyltrimethoxysilane, δ-(3,4-epoxycyclohexyl) butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylethyldimethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptoproyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyldimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, 3-ureidopropyltrimethoxysilane, 3-ureidopropyltriethoxysilane, methylvinyldimethoxysilane, and methylvinyldiethoxysilane. The organosilicon compound may be used alone or two or more types thereof may be used in combination.

The hydrolysis of the organosilicon compound is performed by adding an acidic aqueous solution such as a hydrochloric acid aqueous solution, a sulfuric acid aqueous solution, and an acetic acid aqueous solution to the organosilicon compound followed by stirring.

When the mass of the inorganic oxide microparticles of the present invention is represented by P and the total mass of the organosilicon compound of Formula (M):

$$R^1_a R^2_b Si(OR^3)_{4-(a+b)} \qquad (M)$$

(wherein $R^1$ is a $C_{1-6}$ hydrocarbon group or an organic group having a vinyl group, a methacryloxy group, an acryloxy group, a mercapto group, an amino group, an ureido group, or an epoxy group, $R^2$ is a $C_{1-10}$ hydrocarbon group different from $R^1$, $R^3$ is a $C_{1-8}$ hydrocarbon group or an acyl group, and a and b are 0 or 1) and the hydrolysate and/or partial condensation of the organosilicon compound is represented by W, the mass ratio (P/W) is preferably 30/70 to 90/10, and more preferably 40/60 to 85/15, from the viewpoint of forming a film having a high refractive index and high scratch resistance, and is preferably 10/90 to 70/30, and more preferably 15/85 to 60/40, from the viewpoint of forming a film having high adhesion to a substrate, a base layer, and an upper portion layer.

The matrix component used for the composition for film formation of the present invention is a thermosetting resin, a thermoplastic resin, or an ultraviolet-curing resin.

Examples of the thermosetting resin include a urethane-based resin, an epoxy-based resin, a melamine-based resin, or a (meth)acrylate-based resin.

Examples of the urethane-based resin include a reactant obtained by a reaction of a block polyisocyanate such as hexamethylene diisocyanate with polyester polyol, polyether polyol, or the like.

Examples of the epoxy-based resin include a polyalkylene ether-modified epoxy resin and an epoxy group-containing compound in which a flexible skeleton (also referred to as soft segment) is introduced into a molecular chain.

Examples of the melamine-based resin include a cured product of etherified methylol melamine with polyester polyol or polyether polyol.

Examples of the (meth)acrylate-based resin include a glycol-based acrylate resin and a non-glycol-based acrylate resin. Examples of the glycol-based acrylate resin include polyethylene glycol diacrylate, neopentyl glycol diacrylate, tripropylene glycol diacrylate, polypropylene glycol diacrylate, polyethylene glycol dimethacrylate, neopentyl glycol dimethacrylate, tripropylene glycol dimethacrylate, ethylene glycol dimethacrylate, diethylene glycol dimethacrylate, triethylene glycol dimethacrylate, polypropylene glycol dimethacrylate, and mixtures thereof.

Examples of the non-glycol-based acrylate resin include non-glycol-based difunctional acrylate resins such as 1,4-butanediol dimethacrylate, 1,6-hexanediol dimethacrylate, 1,9-nonanediol dimethacrylate, 1,10-decanediol dimethacrylate, glycerin dimethacrylate, 2-hydroxy-3-acryloyloxy-propyl methacrylate, 1,6-hexanediol diacrylate, 1,9-nonanediol diacrylate, dimethylol-tricyclodecane diacrylate, and 2-hydroxy-3-acryloyloxypropyl methacrylate, trifunctional (urethane) acrylate resins such as pentaerythritol triacrylate, trimethylolpropane triacrylate, trimethylolpropane trimethacrylate, and pentaerythritolhexamethylene diisocyanate urethane prepolymer, tetrafunctional acrylate resins such as pentaerythritol tetraacrylate, hexafunctional acrylate resins such as dipentaerythritol hexaacrylate, and mixtures thereof.

Among these, the acrylate-based resin is preferable. The glycol-based acrylate resin is preferably polyethylene glycol diacrylate or polypropylene glycol diacrylate. The non-glycol-based acrylate resin is preferably 1,6-hexanediol diacrylate or dipentaerythritol hexaacrylate. One type of the thermosetting resin may be used alone or two or more types thereof may be used in combination.

The thermoplastic resin is preferably an acryl-based resin, an urethane-based resin, or an ester-based resin, and more preferably a self-emulsifying aqueous emulsion resin.

Examples of the acryl-based resin include an aqueous emulsion obtained from an alkyl (meth)acrylate monomer and a polymer emulsion obtained by copolymerizing the monomer with styrene, acrylonitrile, or the like.

Examples of the urethane-based resin include an aqueous emulsion obtained by reacting a polyol compound such as polyester polyol, polyether polyol, and polycarbonate polyol with polyisocyanate.

Examples of the ester-based resin include an aqueous dispersion-type elastomer of multiblock copolymer including a polyester as a hard segment, and a polyether or polyester as a soft segment. In particular, an aqueous dispersion-type urethane-based resin obtained from polyester polyol or polyether polyol and polyisocyanate is preferable. One type of the thermoplastic resin may be used alone or two or more types thereof may be used in combination.

As the ultraviolet-curing resin, a polymer of monofunctional acrylate, a polymer of multifunctional acrylate, or a polymer of mixture thereof may be used. The monofunctional acrylate is a compound having a group selected from the group consisting of an acryloyloxy group ($CH_2$=CH—COO—) and a methacryloyloxy group ($CH_2$=C($CH_3$)—COO—) (hereinafter sometimes referred to as (meth)acryloyloxy group) in the molecule.

Examples of the monofunctional acrylate having a (meth)acryloyoxy group include $C_{4-16}$ alkyl (meth)acrylate, $C_{2-14}$ β-carboxyalkyl (meth)acrylate, $C_{2-14}$ alkylated phenyl (meth)acrylate, methoxypolyethylene glycol (meth)acrylate, phenoxypolyethylene glycol (meth)acrylate, and isobornyl (meth)acrylate.

The multifunctional acrylate is usually a compound having two to six (meth)acryloyloxy groups in the molecule. Examples of a difunctional acrylate having two (meth)acryloyloxy groups include 1,3-butanediol di(meth)acrylate; 1,3-butanediol (meth)acrylate; 1,6-hexanediol di(meth)acrylate; ethylene glycol di(meth)acrylate; diethylene glycol di(meth)acrylate; neopentyl glycol di(meth)acrylate; triethylene glycol di(meth)acrylate; tetraethylene glycol di(meth)acrylate; polyethylene glycol diacrylate; bisphenol A bis(acryloyloxyethyl) ether; ethoxylated bisphenol A di(meth)acrylate; propoxylated neopentyl glycol di(meth)acrylate; and ethoxylated neopentyl glycol di(meth)acrylate and 3-methylpentanediol di(meth)acrylate.

Examples of a multifunctional acrylate having three to six (meth)acryloyloxy groups include trimethylolpropane tri(meth)acrylate; pentaerythritol tri(meth)acrylate; tris(2-hydroxyethyl)isocyanurate tri(meth)acrylate; ethoxylated trimethylolpropane tri(meth)acrylate; propoxylated trimethylolpropane tri(meth)acrylate; pentaerythritol tetra(meth)acrylate; dipentaerythritol penta(meth)acrylate; dipentaerythritol hexa(meth)acrylate; tripentaerythritol tetra(meth)acrylate; tripentaerythritol penta(meth)acrylate; tripentaerythritol hexa(meth)acrylate; tripentaerythritol hepta(meth)acrylate; tripentaerythritol octa(meth)acrylate; a reactant of pentaerythritol tri(meth)acrylate with an acid anhydride; a reactant of dipentaerythritol penta(meth)acrylate with an acid anhydride; a reactant of tripentaerythritol hepta(meth)acrylate with an acid anhydride; caprolactone-modified trimethylolpropane tri(meth)acrylate; caprolactone- modified pentaerythritol tri(meth)acrylate; caprolactone-modified tris(2- hydroxyethyl)isocyanurate tri(meth)acrylate; caprolactone-modified pentaerythritol tetra(meth)acrylate; caprolactone-modified dipentaerythritol penta (meth)acrylate; caprolactone-modified dipentaerythritol hexa(meth)acrylate; caprolactone-modified tripentaerythritol tetra(meth)acrylate; caprolactone-modified tripentaerythritol penta(meth)acrylate; caprolactone-modified tripentaerythritol hexa(meth)acrylate; caprolactone-modified tripentaerythritol hepta(meth)acrylate; caprolactone-modified tripentaerythritol octa(meth)acrylate; a reactant of caprolactone-modified pentaerythritol tri(meth)acrylate with an acid anhydride; and a reactant of caprolactone-modified dipentaerythritol penta(meth)acrylate with an acid anhydride, and a reactant of caprolactone- modified tripentaerythritol hepta(meth)acrylate and an acid anhydride. In the specific examples of the multifunctional acrylate, (meth)acrylate means acrylate or methacrylate.

Examples of commercially available products of the multifunctional acrylate include A-DOD-N, A-HD-N, A-NOD-N, APG-100, APG-200, APG-400, A-GLY-9E, A-GLY-20E, A-TMM-3, A-TMPT, AD-TMP, ATM-35E, A-TMMT, A-9550, A-DPH, HD-N, NOD-N, NPG, and TMPT (available from Shin Nakamura Chemical Co., Ltd.), ARONIX (registered trademark) M-220, M-325, M-240, M-270, M-309, M-310, M-321, M-350, M-360, M-305, M-306, M-450, M-451, M-408, M-400, M-402, M-403, M-404, M-405, and M-406 (available from Toagosei Co., Ltd.), and EBECRYL (registered trademark)-11, -145, -150, -40, -140, and -180, DPGDA, HDDA, TPGDA, HPNDA, PETIA, PETRA, TMPTA, TMPEOTA, DPHA, and EBECRYL series (available from DAICEL-ALLNEX LTD.). One type of the ultraviolet-curing resin may be used alone or two or more types thereof may be used in combination.

When the mass of the inorganic oxide microparticles of the present invention is represented by P and the mass of the matrix component selected from the thermosetting resin, thermoplastic resin, and ultraviolet-curing resin is represented by W, the mass ratio (P/W) is preferably 30/70 to 90/10, and more preferably 40/60 to 85/15, from the viewpoint of forming a film having a high refractive index and high scratch resistance. The mass ratio is preferably 10/90 to 70/30, and more preferably 15/85 to 60/40, from the viewpoint of forming a film having high adhesion to a substrate, a base layer, and an upper portion layer.

When the composition for film formation of the present invention is applied to a substrate and then heated, a cured film can be formed. A coating method is an optional method. For example, a spin coating method, a dip method, a flow coating method, an inkjet method, a spraying method, a bar coating method, a gravure coating method, a slit coating method, a roll coating method, a transfer printing method, coating by a brush, a blade coating method, or an air-knife coating method can be used.

Examples of the substrate include a substrate formed from silicon, glass with a film of an indium tin oxide (ITO), glass with a film of indium zinc oxide (IZO), a plastic film of polyethylene terephthalate (PET), a polyimide or the like, glass, quartz, ceramic, or the like. A flexible substrate having flexibility may be used.

The composition for film formation of the present invention may be used after filtration. The effective filtration area and material quality of a filtering material are not particularly limited. The filtration may be varied depending on a target product.

The heating after application of the composition for film formation is to evaporate the solvent. The heating temperature is not particularly limited. For example, the heating may be performed at 40 to 400° C. In this case, the temperature may be varied in two or more steps to make the distribution of the film thickness uniform, exert high uniformity, and promote a reaction on the substrate.

A heating method is not particularly limited. For example, the solvent may be evaporated under an appropriate atmosphere such as air, an inert gas such as nitrogen, and vacuum by using a hot plate or an oven.

For the heating temperature and heating time, a condition suitable for a process of producing a target member may be selected or a condition in which physical properties of a film to be obtained are suitable for properties required for the member may be selected.

The member of the present invention that is thus obtained has a film having high transparency, adhesion, and scratch resistance. When the substrate is a substrate applied to an optical application, the member of the present invention is useful as an optical member used for a liquid crystal display, an organic electroluminescence (EL) display, an optical semiconductor (LED) element, a solid-state imaging element, an organic thin film solar cell, a dye-sensitized solar cell, or the like.

To a surface of a member with a film obtained by the aforementioned method or the like, an anti-reflective coating can be further formed. The anti-reflective coating can be formed by alternately layering a high-refractive index thin film and a low-refractive index thin film by a vapor deposition method, a coating method, or the like that is usually performed. For the high-refractive index thin film, $ZrO_2$, $TiO_2$, $Ti_3O_5$, $CeO_2$, $Ta_2O_5$, $HfO_2$, or $Nb_2O_5$ may be used, and for the low-refractive index thin film, $MgF_2$, $SiO_2$, or SiO may be used.

EXAMPLES

Hereinafter, Examples of the present invention will be described. The present invention is not limited to these examples. Method for measuring physical properties are as follows.

Moisture content: It was determined by the Karl Fischer titration method.

Primary particle diameter: A dispersion was dried on a copper mesh and observed by a transmission electron microscope. The particle diameter of 100 particles was measured, and the average thereof was determined as the primary particle diameter.

Specific gravity: It was determined by a density hydrometer method (20° C.).

Viscosity: It was determined by an Ostwald viscometer (20° C.).

Particle diameter based on a dynamic light scattering method: The dispersed particle diameter was determined by Zetasizer Nano manufactured by Malvern Panalytical Ltd.

Solid content concentration: It was determined using a residue solid content during baking at 500° C.

Amount of organic silane compound bonded: The amount of organic silane compound bonded to modified metal oxide colloidal particles was determined by elemental analysis.

Stability: A dispersion was stored under a condition of 50° C. for one week. After the storage, a case where the particle diameter was not changed was represented by "◯" and a case where the particle diameter was changed was represented by "x".

Production Example 1

126.2 g of pure water was placed in a 1-L container. 17.8 g of metastannic acid (15 g in terms of $SnO_2$), 284 g of titanium tetraisopropoxide (80 g in terms of $TiO_2$), 84 g of oxalic acid dihydrate (70 g in terms of oxalic acid), and 438 g of aqueous solution of 35% by mass tetraethylammonium hydroxide were added thereto with stirring. In the resulting mixed solution, the mole ratio of oxalic acid to titanium atoms was 0.78, and the mole ratio of tetraethylammonium hydroxide to titanium atoms was 1.04. 950 g of the mixed solution was held at 80° C. for 2 hours, the pressure was reduced to 580 Torr, and the mixed solution was held for 2 hours, to prepare a titanium mixed solution. The pH of the prepared titanium mixed solution was 4.7, the conductivity was 27.2 mS/cm, and the $TiO_2$ concentration was 8.4% by mass. 950 g of the titanium mixed solution and 950 g of pure water were placed in a 3-L glass lining autoclave container, and a hydrothermal treatment was performed at 140° C. for 5 hours. After cooling to room temperature, the solution after the hydrothermal treatment was taken out. An aqueous dispersion of light-opal titanium oxide colloidal particles was obtained. In the obtained dispersion, the pH was 3.9, the conductivity was 19.7 mS/cm, the $TiO_2$ concentration was 4.2% by mass, the tetraethylammonium hydroxide concentration was 4.0% by mass, the oxalic acid concentration was 1.8% by mass, and the particle diameter based on a dynamic light scattering method was 16 nm. In observation by a transmission electron microscope, ellipsoid particles having a primary particle diameter of 5 to 15 nm were observed. By X-ray diffraction analysis of a powder obtained by drying the resulting dispersion at 110° C., the powder was confirmed to be a rutile type crystal. The obtained titanium oxide colloidal particles were defined as titanium oxide-containing nuclear particles (A).

Subsequently, 27.9 g of sodium silicate aqueous solution (sodium silicate JIS-3, containing 34% by mass of $SiO_2$, available from Fuji Chemical Industries Co., Ltd.) was diluted with 27.9 g of pure water, and 8.6 g of sodium stannate trihydrate (containing 55% by mass of $SnO_2$, available from Showa Kako Corporation) was added and dissolved with stirring, to obtain a silicic acid-sodium stannate aqueous solution. 64.4 g of the obtained silicic acid-sodium stannate aqueous solution was diluted with 411 g of pure water, and then drawn through a column filled with a hydrogen-type cation exchange resin (AMBERLITE (registered trademark) IR-120B), to obtain 570 g of aqueous dispersion of silicon dioxide-stannic acid composite oxide colloidal particles (pH: 2.7, containing 0.83% by mass of $SnO_2$ and 1.67% by mass of $SiO_2$, mass ratio $SiO_2/SnO_2$: 2.0).

Subsequently, 2.9 g of diisopropylamine was added to the obtained aqueous dispersion of silicon dioxide-stannic acid composite oxide colloidal particles. The resulting dispersion was an aqueous dispersion of alkaline silicon dioxide-stannic acid composite oxide colloidal particles. The pH was 8.2 and the primary particle diameter of the colloidal particles was 5 nm or less. The resulting alkaline silicon dioxide-stannic acid composite oxide colloidal particles were used as a coating material (B).

To 1,900 g of aqueous dispersion of the titanium oxide-containing nuclear particles (A), 570 g of the coating material (B) including silicon dioxide-stannic acid composite oxide colloidal particles was then added with stirring. The mixture was held at a temperature of 95° C. for 3 hours, to obtain an aqueous dispersion of modified titanium oxide colloidal particles (C). After then, the obtained aqueous dispersion of modified titanium oxide colloidal particles was drawn through a column filled with a hydrogen-type cation exchange resin (AMBERLITE IR-120B), to obtain 2,730 g of aqueous dispersion of acidic modified titanium oxide composite oxide colloidal particles. In the obtained dispersion, the pH was 2.7 and the total metal oxide concentration was 4.0% by mass. To the resulting dispersion, 2.2 g of diisobutylamine was added. The obtained dispersion had a pH of 4.5. Subsequently, the dispersion containing diisobutylamine was placed in an evaporator equipped with an eggplant-shaped flask, and then concentrated. While methanol was added, water was distilled off at 600 Torr. As a result, 533 g of methanol dispersion of the modified titanium oxide colloidal particles (C) was obtained. The resulting methanol dispersion had a specific gravity of 0.949, a viscosity of 1.2 mPa·s, a pH of 4.8 (diluted with water in the same amount as that of the dispersion), a total metal oxide concentration of 20.5% by mass, and a moisture content of 3.1%.

Example 1

To 533 g of the methanol dispersion of the modified titanium oxide colloidal particles (C) obtained in Production Example 1, 5.5 g of polyether-modified silane (3-[methoxy(polyethyleneoxy)$_n$propyl]trimethoxysilane (n=5 to 15); trade name X-12-641 available from Shin-Etsu silicones) was added. The mixture was heated to reflux at 70° C. for 5 hours, to obtain a methanol dispersion of modified titanium oxide colloidal particles (C) in which a polyether group was bonded to a surface thereof. Subsequently, while propylene glycol monomethyl ether was added, methanol was distilled off at 80 Torr by using an evaporator. As a result, methanol was replaced by propylene glycol monomethyl ether, to obtain 270 g of propylene glycol monomethyl ether dispersion of modified titanium oxide colloidal particles in which polyether-modified silane was bonded to a surface thereof. In the obtained dispersion, the specific gravity was 1.353, the viscosity was 7.0 mPa·s, the total metal oxide concentration was 40.3% by mass, the primary particle diameter based on observation by a transmission electron microscope was 5 to 10 nm, and the particle diameter based on a dynamic light scattering method was 9 nm. The amount of the polyether-modified silane bonded to the surface of the modified titanium oxide colloidal particles relative to the amount of the modified titanium oxide colloidal particles (C) was 4.0% by mass.

Example 2

The same operation as in Example 1 was performed except that the polyether-modified silane in Example 1 was changed to 2-[methoxy(polyethyleneoxy)$_n$propyl]trimethoxysilane (n=6 to 9) (available from Gelest, Inc.). In the obtained dispersion, the specific gravity was 1.353, the viscosity was 7.2 mPa·s, the total metal oxide concentration was 40.2% by mass, the primary particle diameter based on observation by a transmission electron microscope was 5 to 10 nm, and the particle diameter based on a dynamic light scattering method was 10 nm. The amount of 2-[methoxy(polyethyleneoxy)$_n$propyl]trimethoxysilane (n=6 to 9) bonded to the surface of the modified titanium oxide colloidal particles relative to the amount of the modified titanium oxide colloidal particles (C) was 3.8% by mass.

Example 3

The same operation as in Example 1 was performed except that the polyether-modified silane in Example 1 was changed to 2-[methoxy(polyethyleneoxy)$_n$propyl]trimethoxysilane (n=9 to 12) (available from Gelest, Inc.). In the obtained dispersion, the specific gravity was 1.351, the viscosity was 6.9 mPa·s, the total metal oxide concentration was 40.1% by mass, the primary particle diameter based on observation by a transmission electron microscope was 5 to 10 nm, and the particle diameter based on a dynamic light scattering method was 8 nm. The amount of 2-[methoxy(polyethyleneoxy)$_n$propyl]trimethoxysilane (n=9 to 12) bonded to the surface of the modified titanium oxide colloidal particles relative to the modified titanium oxide colloidal particles (C) was 4.0% by mass.

Example 4

The same operation as in Example 1 was performed except that the polyether-modified silane in Example 1 was changed to [methoxytriethyleneoxypropyl]trimethoxysilane (available from Gelest, Inc.). In the obtained dispersion, the specific gravity was 1.354, the viscosity was 7.0 mPa·s, the total metal oxide concentration was 40.0% by mass, the primary particle diameter based on observation by a transmission electron microscope was 5 to 10 nm, and the particle diameter based on a dynamic light scattering method was 12 nm. The amount of [methoxyethyleneoxypropyl]trimethoxysilane bonded to the surface of the modified titanium oxide colloidal particles relative to the modified titanium oxide colloidal particles (C) was 3.9% by mass.

Example 5

The same operation as in Example 1 was performed except that the methanol dispersion of modified titanium oxide colloidal particles (C) obtained in Production Example 1 was changed to a methanol dispersion of rutile-type titanium oxide-tin oxide-zirconium oxide particles coated with a tin oxide-silicon oxide composite oxide described in Example 1 of WO12/165620. In the obtained dispersion, the specific gravity was 1.362, the viscosity was 7.0 mPa·s, the total metal oxide concentration was 40.5% by mass, the primary particle diameter based on observation by a transmission electron microscope was 5 to 10 nm, and the particle diameter based on a dynamic light scattering method was 15 nm. The amount of the polyether-modified silane bonded to the surface of modified rutile-type titanium oxide-tin oxide-zirconium oxide colloidal particles relative to the modified rutile-type titanium oxide-tin oxide-zirconium oxide colloidal particles was 3.8% by mass.

Example 6

The same operation as in Example 1 was performed except that the methanol dispersion of modified titanium oxide colloidal particles (C) obtained in Production Example 1 was changed to a methanol dispersion of zirconium oxide-tin oxide particles coated with a tin oxide-silicon oxide composite oxide described in Example 1 of Japanese Patent No. 5704345. In the obtained dispersion, the specific gravity was 1.381, the viscosity was 6.7 mPa·s, the total metal oxide concentration was 40.5% by mass, the primary particle diameter based on observation by a transmission electron microscope was 5 to 10 nm, and the particle diameter based on a dynamic light scattering method was 16 nm. The amount of the polyether-modified silane bonded to the surface of modified zirconium oxide colloidal particles relative to the modified zirconium oxide colloidal particles was 3.5% by mass.

Example 7

The same operation as in Example 1 was performed except that propylene glycol monomethyl ether in Example 1 was changed to 2-propanol. In the obtained dispersion, the specific gravity was 1.211, the viscosity was 3.3 mPa·s, the total metal oxide concentration was 30.5% by mass, the primary particle diameter based on observation by a transmission electron microscope was 5 to 10 nm, and the particle diameter based on a dynamic light scattering method was 14 nm. The amount of the polyether-modified silane bonded to the surface of the modified titanium oxide colloidal particles relative to the modified titanium oxide colloidal particles (C) was 4.0% by mass.

Example 8

The same operation as in Example 1 was performed except that propylene glycol monomethyl ether in Example 1 was changed to propylene glycol monomethyl ether acetate. In the obtained dispersion, the specific gravity was 1.184, the viscosity was 5.5 mPa·s, the total metal oxide concentration was 30.5% by mass, the primary particle diameter based on observation by a transmission electron microscope was 5 to 10 nm, and the particle diameter based on a dynamic light scattering method was 12 nm. The amount of the polyether-modified silane bonded to the surface of the modified titanium oxide colloidal particles relative to the modified titanium oxide colloidal particles (C) was 4.0% by mass.

Example 9

The same operation as in Example 1 was performed except that the addition amount of the polyether-modified silane in Example 1 was changed to 1.1 g. In the obtained dispersion, the specific gravity was 1.180, the viscosity was 3.1 mPa·s, the total metal oxide concentration was 30.5% by mass, the primary particle diameter based on observation by a transmission electron microscope was 5 to 10 nm, and the particle diameter based on a dynamic light scattering method was 12 nm. The amount of the polyether-modified silane bonded to the surface of the modified titanium oxide colloidal particles relative to the modified titanium oxide colloidal particles (C) was 0.6% by mass.

Example 10

The same operation as in Example 1 was performed except that the addition amount of the polyether-modified silane in Example 1 was changed to 11.0 g. In the obtained dispersion, the specific gravity was 1.512, the viscosity was 14.4 mPa·s, the total metal oxide concentration was 50.0% by mass, the primary particle diameter based on observation by a transmission electron microscope was 5 to 10 nm, and the particle diameter based on a dynamic light scattering method was 12 nm. The amount of the polyether-modified silane bonded to the surface of the modified titanium oxide colloidal particles relative to the modified titanium oxide colloidal particles (C) was 7.0% by mass.

Example 11

The same operation as in Example 1 was performed except that the total metal oxide concentration of the dispersion in Example 1 was changed. In the obtained dispersion, the specific gravity was 1.598, the viscosity was 53.3 mPa·s, the total metal oxide concentration was 55.0% by mass, the primary particle diameter based on observation by a transmission electron microscope was 5 to 10 nm, and the particle diameter based on a dynamic light scattering method was 9 nm. The amount of the polyether-modified silane bonded to the surface of the modified titanium oxide colloidal particles relative to the modified titanium oxide colloidal particles (C) was 4.0% by mass.

Example 12

The same operation as in Example 1 was performed except that the total metal oxide concentration of the dispersion in Example 1 was changed.

In the obtained dispersion, the specific gravity was 1.720, the viscosity was 72.1 mPa·s, the total metal oxide concentration was 60.0% by mass, the primary particle diameter based on observation by a transmission electron microscope was 5 to 10 nm, and the particle diameter based on a dynamic light scattering method was 9 nm. The amount of the polyether-modified silane bonded to the surface of the modified titanium oxide colloidal particles relative to the modified titanium oxide colloidal particles (C) was 4.0% by mass.

Comparative Example 1

The same operation as in Example 1 was performed except that the polyether-modified silane in Example 1 was changed to n-propyltrimethoxysilane (trade name: KBM-3033 available from Shin-Etsu silicones). In the obtained dispersion, the specific gravity was 1.106, the viscosity was 10.1 mPa·s, the total metal oxide concentration was 25.2% by mass, the primary particle diameter based on observation by a transmission electron microscope was 5 to 10 nm, and the particle diameter based on a dynamic light scattering method was 35 nm. The amount of n-propyltrimethoxysilane bonded to the surface of the modified titanium oxide colloidal particles relative to the modified titanium oxide colloidal particles (C) was 3.4% by mass.

Comparative Example 2

The same operation as in Example 1 was performed except that the polyether-modified silane in Example 1 was changed to methacryloxypropyltrimethoxysilane (trade name: KBM-503 available from Shin-Etsu silicones). The dispersion was gelled during solvent replacement of methanol by propylene glycol monomethyl ether. As a result, a dispersion was not obtained. The amount of methacryloxypropyltrimethoxysilane bonded to the surface of the modified titanium oxide colloidal particles relative to the modified titanium oxide colloidal particles (C) was 2.6% by mass.

Comparative Example 3

The same operation as in Example 1 was performed except that the polyether-modified silane in Example 1 was changed to ureidopropyltriethoxysilane (trade name: KBE-585 available from Shin-Etsu silicones). In the obtained dispersion, the specific gravity was 1.075, the viscosity was 15.2 mPa·s, the total metal oxide concentration was 24.1% by mass, the primary particle diameter based on observation by a transmission electron microscope was 5 to 10 nm, and the particle diameter based on a dynamic light scattering method was 60 nm. The amount of ureidopropyltriethoxysilane bonded to the surface of the modified titanium oxide colloidal particles relative to the modified titanium oxide colloidal particles (C) was 3.1% by mass.

Comparative Example 4

The same operation as in Example 1 was performed except that the polyether-modified silane in Example 1 was changed to N-phenyl-3-aminopropyltrimethoxysilane (trade name: KBM-573 available from Shin-Etsu silicones). In the obtained dispersion, the specific gravity was 1.201, the viscosity was 9.3 mPa·s, the total metal oxide concentration was 32.8% by mass, the primary particle diameter based on observation by a transmission electron microscope was 5 to 10 nm, and the particle diameter based on a dynamic light scattering method was 58 nm. The amount of N-phenyl-3-aminopropyltrimethoxysilane bonded to the surface of the modified titanium oxide colloidal particles relative to the modified titanium oxide colloidal particles (C) was 2.6% by mass.

Comparative Example 5

The same operation as in Example 1 was performed except that the polyether-modified silane in Example 1 was changed to 3-glycidoxypropyltrimethoxysilane (trade name: KBM-403 available from Shin-Etsu silicones). In the obtained dispersion, the specific gravity was 1.208, the viscosity was 4.8 mPa·s, the total metal oxide concentration was 30.5% by mass, the primary particle diameter based on observation by a transmission electron microscope was 5 to 10 nm, and the particle diameter based on a dynamic light scattering method was 50 nm. The amount of 3-glycidoxypropyltrimethoxysilane bonded to the surface of the modified titanium oxide colloidal particles relative to the modified titanium oxide colloidal particles (C) was 3.2% by mass.

TABLE 1

| | Example | | | | | |
|---|---|---|---|---|---|---|
| | Example 1 | Example 2 | Example 3 | Example 4 | Example 5 | Example 6 |
| Amphiphilic organic silane compound | 3-[methoxy (polyethyleneoxy)$_n$-propyl] trimethoxysilane (n = 5 to 15) | 2-[methoxy (polyethyleneoxy)$_n$-propyl] trimethoxysilane (n = 6 to 9) | 2-[methoxy (polyethyleneoxy)$_n$-propyl] trimethoxysilane (n = 9 to 12) | [methoxy-triethyleneoxypropyl] trimethoxysilane | 3-[methoxy (polyethyleneoxy)$_n$-propyl] trimethoxysilane (n = 5 to 15) | 3-[methoxy (polyethyleneoxy)$_n$-propyl] trimethoxysilane (n = 5 to 15) |
| Amphiphilic organic silane compound (relative to solid content: % by mass) | 4.0 | 3.8 | 4.0 | 3.9 | 3.8 | 3.5 |
| Solid content concentration (% by mass) | 40.3 | 40.2 | 40.1 | 40.0 | 40.5 | 40.5 |
| Dispersed particle diameter (nm) | 9 | 10 | 8 | 12 | 15 | 16 |
| Stability of dispersion | ○ | ○ | ○ | ○ | ○ | ○ |

TABLE 1-continued

| | Example 7 | Example 8 | Example 9 | Example 10 | Example 11 | Example 12 |
|---|---|---|---|---|---|---|
| Amphiphilic organic silane compound | 3-[methoxy (polyethyleneoxy)$_n$-propyl] trimethoxy-silane (n = 5 to 15) | 3-[methoxy (polyethyleneoxy)$_n$-propyl] trimethoxy-silane (n = 5 to 15) | 3-[methoxy (polyethyleneoxy)$_n$-propyl] trimethoxy-silane (n = 5 to 15) | 3-[methoxy (polyethyleneoxy)$_n$-propyl] trimethoxy-silane (n = 5 to 15) | 3-[methoxy (polyethyleneoxy)$_n$-propyl] trimethoxy-silane (n = 5 to 15) | 3-[methoxy (polyethyleneoxy)$_n$-propyl] trimethoxy-silane (n = 5 to 15) |
| Amphiphilic organic silane compound (relative to solid content: % by mass) | 4.0 | 4.0 | 0.6 | 7.0 | 4.0 | 4.0 |
| Solid content concentration (% by mass) | 30.5 | 30.5 | 30.5 | 50.0 | 55.0 | 60.0 |
| Dispersed particle diameter (nm) | 14 | 12 | 12 | 12 | 9 | 9 |
| Stability of dispersion | ○ | ○ | ○ | ○ | ○ | ○ |

In the dipsersions of Examples 1 to 12 of the present invention, the total metal oxide concentration was 30% by mass or more, and the stability was excellent.

TABLE 2

| | Comparative Example 1 | Comparative Example 2 | Comparative Example 3 | Comparative Example 4 | Comparative Example 5 |
|---|---|---|---|---|---|
| Organic silane compound | n-propyltri-methoxysilane | Methacryloxy-propyltrimeth-oxysilane | Ureidopropyl-triethoxysilane | N-phenyl-3-aminopropyltri-methoxysilane | 3-glycidoxy-propyltri-methoxysilane |
| Organic silane compound (relative to solid content: % by mass) | 3.4 | 2.6 | 3.1 | 2.6 | 3.2 |
| Solid content concentration (% by mass) | 25.2 | Gelation | 24.1 | 32.8 | 30.5 |
| Dispersed particle diameter (nm) | 35 | | 60 | 58 | 50 |
| Stability of dispersion | X | | X | X | X |

In Comparative Examples 1 to 5 of the present invention, the dispersed particle diameter was increased, and the dispersion had low dispersibility. The storage stability was deteriorated.

Production of Cured Film

Example 13

In 30.0 g of propylene glycol monomethyl ether dispersion of modified titanium oxide colloidal particles in which polyether modified silane obtained in Example 1 bonded to a surface thereof, 12.0 g of 3-glycidoxypropyltrimethoxysilane hydrolyzed with 0.01 N hydrochloric acid as a matrix component, 0.24 g of tris-(pentanedionate)aluminum(III) as a curing agent, and 18.0 g of methanol as a solvent were mixed, to prepare a composition for film formation. The mass ratio of the matrix component to all the metal oxide components in the dispersion was 50/50. Subsequently, the composition for film formation was applied to a polyethylene terephthalate (PET) film with a thickness of 100 μm by a spin coating method. The obtained film was cured at 110° C. for 2 hours, to prepare a resin film having a film having a thickness of 1 μm including modified titanium oxide colloidal particles having a polyether bonded thereto.

Example 14

The same operation as in Example 13 was performed except that the mass ratio of all the metal oxide components and the matrix component in the dispersion in Example 13 was changed to 70/30. Thus, a resin film having a film having a thickness of 1 μm including modified titanium oxide colloidal particles having polyether-modified silane bonded thereto was prepared.

Example 15

The same operation as in Example 13 was performed except that the mass ratio of all the metal oxide components and the matrix component in the dispersion in Example 13 was changed to 80/20. Thus, a resin film having a film having a thickness of 1 µm including modified titanium oxide colloidal particles having polyether-modified silane bonded thereto was prepared.

Example 16

The same operation as in Example 13 was performed except that the dispersion obtained in Example 1 was changed to the dispersion obtained in Example 2. Thus, a resin film having a film having a thickness of 1 µm including modified titanium oxide colloidal particles having 2-[methoxy(polyethyleneoxy)$_n$propyl]trimethoxysilane (n=6 to 9) bonded thereto was prepared.

Example 17

The same operation as in Example 13 was performed except that the dispersion obtained in Example 1 was changed to the dispersion obtained in Example 3. Thus, a resin film having a film having a thickness of 1 µm including modified titanium oxide colloidal particles having 2-[methoxy(polyethyleneoxy)$_n$propyl]trimethoxysilane (n=9 to 12) bonded thereto was prepared.

Example 18

The same operation as in Example 13 was performed except that the dispersion obtained in Example 1 was changed to the dispersion obtained in Example 4. Thus, a resin film having a film having a thickness of 1 µm including modified titanium oxide colloidal particles having 2-[methoxytriethyleneoxypropyl]trimethoxysilane bonded thereto was prepared.

Example 19

The same operation as in Example 13 was performed except that the dispersion obtained in Example 1 was changed to the dispersion obtained in Example 5. Thus, a resin film having a film having a thickness of 1 µm including modified rutile-type titanium oxide-tin oxide-zirconium oxide colloidal particles having polyether-modified silane bonded thereto was prepared.

Example 20

The same operation as in Example 13 was performed except that the dispersion obtained in Example 1 was changed to the dispersion obtained in Example 6. Thus, a resin film having a film having a thickness of 1 µm including modified zirconium oxide colloidal particles having polyether-modified silane bonded thereto was prepared.

Example 21

The same operation as in Example 13 was performed except that the dispersion obtained in Example 1 was changed to the dispersion obtained in Example 9. Thus, a resin film having a film including modified titanium oxide colloidal particles having polyether-modified silane bonded thereto was prepared.

Example 22

The same operation as in Example 13 was performed except that the dispersion obtained in Example 1 was changed to the dispersion obtained in Example 10. Thus, a resin film having a film including modified titanium oxide colloidal particles having polyether-modified silane bonded thereto was prepared.

Example 23

In 30.0 g of the dispersion obtained in Example 1, 12.0 g of dipentaerythritol hexaacrylate (DPHA) and 0.6 g of IRGACURE-500 (available from Ciba Specialty Chemicals) as a polymerization initiator, and 11.4 g of isopropyl alcohol as a solvent were mixed, to prepare an ultraviolet-curable acrylate solution. Subsequently, the ultraviolet-curable acrylate solution was applied to a polyethylene terephthalate (PET) film with a thickness of 100 µm by a bar-coating method. The solvent was removed at 90° C., and the obtained film was irradiated with ultraviolet light, resulting in curing. As a result, a resin film having a film having a thickness of 3 µm including modified titanium oxide colloidal particles having polyether-modified silane bonded thereto was prepared.

Example 24

In 30.0 g of the dispersion obtained in Example 1, 12.0 g of pentaerythritol triacrylate and 0.4 g of IRGACURE-500 (available from Ciba Specialty Chemicals) as a polymerization initiator, and 11.6 g of isopropyl alcohol as a solvent were mixed, to prepare an ultraviolet-curable acrylate solution. Subsequently, the ultraviolet-curable acrylate solution was applied to a polyethylene terephthalate (PET) film with a thickness of 100 µm by a bar-coating method. The solvent was removed at 90° C., and the obtained film was irradiated with ultraviolet light, resulting in curing. As a result, a resin film having a film having a thickness of 3 µm including modified titanium oxide colloidal particles having polyether-modified silane bonded thereto was prepared.

Comparative Example 6

The same operation as in Example 13 was performed except that the dispersion obtained in Example 1 was changed to the propylene glycol monomethyl ether dispersion of modified titanium oxide colloidal particles having n-propyltrimethoxysilane bonded to the surface obtained in Comparative Example 1. Thus, a resin film having a film having a thickness of 3 µm including modified titanium oxide colloidal particles having n-propyltrimethoxysilane bonded thereto was prepared.

Comparative Example 7

The same operation as in Example 13 was performed except that the dispersion obtained in Example 1 was changed to the propylene glycol monomethyl ether dispersion of modified titanium oxide colloidal particles having ureidopropyltriethoxysilane bonded to the surface obtained in Comparative Example 3. Thus, a resin film having a film having a thickness of 3 µm including modified titanium oxide colloidal particles having ureidopropyltriethoxysilane bonded thereto was prepared.

Comparative Example 8

The same operation as in Example 13 was performed except that the dispersion obtained in Example 1 was changed to the propylene glycol monomethyl ether dispersion of modified titanium oxide colloidal particles having N-phenyl-3-aminopropyltrimethoxysilane bonded to the surface obtained in Comparative Example 4. Thus, a resin film having a film having a thickness of 3 μm including modified titanium oxide colloidal particles having N-phenyl-3-aminopropyltrimethoxysilane bonded thereto was prepared.

Comparative Example 9

The same operation as in Example 13 was performed except that the dispersion obtained in Example 1 was changed to the propylene glycol monomethyl ether dispersion of modified titanium oxide colloidal particles having 3-glycidoxypropyltrimethoxysilane bonded to the surface obtained in Comparative Example 5. Thus, a resin film having a film having a thickness of 3 μm including modified titanium oxide colloidal particles having 3-glycidoxypropyltrimethoxysilane bonded thereto was prepared.

Comparative Example 10

The same operation as in Example 24 was performed except that the dispersion obtained in Example 1 was changed to the propylene glycol monomethyl ether dispersion of modified titanium oxide colloidal particles having n-propyl trimethoxysilane bonded to the surface obtained in Comparative Example 1. Thus, a resin film having a film having a thickness of 3 μm including modified titanium oxide colloidal particles having n-propyltrimethoxysilane bonded thereto was prepared.

Physical properties of an optical member having the film obtained in each of Examples and Comparative Examples were measured by the following measurement methods.

(1) Refractive Index:
It was measured by an Abbe refractive index meter (NAR-2T manufactured by ATAGO CO., LTD.)

(2) Scratch Resistance Test
A surface of the film was scratched by steel wool #0000. Resistance to scratch was visually judged. Judgement criteria are as follows.
A: A scratch was not confirmed at all.
B: A scratch was slightly confirmed.
C: A remarkable scratch was confirmed.
D: A remarkable scratch was confirmed and separation of the film was confirmed.

(3) Adhesion Test
The film was cross-cut in 100 grids with an interval of 1 mm, and an adhesive tape (cellophane tape, product of Nichiban Co., Ltd.) was strongly applied to the cross-cut area. The adhesive tape was rapidly detached. The presence or absence of separation of cured film after detaching the adhesive tape was confirmed. Evaluation criteria are as follows.
A: Separation was not confirmed at all.
B: Separation of 1 to 30 grids in the 100 grids was confirmed.
C: Separation of 31 to 60 grids in the 100 grids was confirmed.
D: Separation of 61 to 90 grids in the 100 grids was confirmed.
E: Separation of 91 or more grids in the 100 grids was confirmed.

(4) Transparency Test
The presence or absence of clouding of the cured film under a fluorescent lamp in a dark room was visually confirmed. Judgement criteria are as follows.
○: Clouding did not occur at all.
Δ: Clouding had no problem for a transparent cured film.
x: Whitening significantly occurred.

TABLE 3

|  | Example | | | | | |
| --- | --- | --- | --- | --- | --- | --- |
|  | Example 13 | Example 14 | Example 15 | Example 16 | Example 17 | Example 18 |
| Dispersion | Example 1 | Example 1 | Example 1 | Example 2 | Example 3 | Example 4 |
| Matrix | 3-glycidoxy-propyl-trimethoxy-silane hydrolysate | 3-glycidoxy-propyl-trimethoxy-silane hydrolysate | 3-glycidoxy-propyl-trimethoxy-silane hydrolysate | 3-glycidoxy-propyl-trimethoxy-silane hydrolysate | 3-glycidoxy-propyl-trimethoxy-silane hydrolysate | 3-glycidoxy-propyl-trimethoxy-silane hydrolysate |
| Matrix/inorganic oxide | 50/50 | 30/70 | 20/80 | 50/50 | 50/50 | 50/50 |
| Refractive index | 1.73 | 1.8 | 1.85 | 1.67 | 1.61 | 1.72 |
| Scratch resistance | A | A | A | A | A | A |
| Adhesion | A | A | A | A | A | A |
| Transparency | ○ | ○ | ○ | ○ | ○ | ○ |

|  | Example | | | | | |
| --- | --- | --- | --- | --- | --- | --- |
|  | Example 19 | Example 20 | Example 21 | Example 22 | Example 23 | Example 24 |
| Dispersion | Example 5 | Example 6 | Example 9 | Example 10 | Example 1 | Example 1 |
| Matrix | 3-glycidoxy-propyl-trimethoxy-silane hydrolysate | 3-glycidoxy-propyl-trimethoxy-silane hydrolysate | 3-glycidoxy-propyl-trimethoxy-silane hydrolysate | 3-glycidoxy-propyl-trimethoxy-silane hydrolysate | Dipentaerythritol hexaacrylate | Pentaerythritol triacrylate |
| Matrix/inorganic oxide | 50/50 | 50/50 | 50/50 | 50/50 | 50/50 | 50/50 |
| Refractive index | 1.71 | 1.71 | 1.73 | 1.69 | 1.72 | 1.71 |
| Scratch resistance | A | A | A | B | A | A |
| Adhesion | A | B | B | A | A | A |
| Transparency | ○ | ○ | ○ | ○ | ○ | ○ |

Optical members having the films in Examples 13 to 24 of the present invention exhibited a high refractive index of 1.60 or more and had excellent scratch resistance, adhesion, and transparency.

TABLE 4

| | Comparative Example | | | | |
|---|---|---|---|---|---|
| | Comparative Example 6 | Comparative Example 7 | Comparative Example 8 | Comparative Example 9 | Comparative Example 10 |
| Dispersion | Comparative Example 1 | Comparative Example 3 | Comparative Example 4 | Comparative Example 5 | Comparative Example 1 |
| Matrix | 3-glycidoxy-propyl-trimethoxysilane hydrolysate | 3-glycidoxy-propyl-trimethoxysilane hydrolysate | 3-glycidoxy-propyl-trimethoxysilane hydrolysate | 3-glycidoxy-propyl-trimethoxysilane hydrolysate | Pentaerythritol hexaacrylate |
| Matrix/inorganic oxide | 50/50 | 50/50 | 50/50 | 50/50 | 50/50 |
| Refractive index | Not Applicable | Not Applicable | Not Applicable | 1.65 | 1.65 |
| Scratch resistance | C | B | C | A | C |
| Adhesion: | E | B | D | D | A |
| Transparency | ○ | X | X | Δ | Δ |

Optical members having the films in Comparative Examples 6 to 10 of the present invention had deteriorated transparency, scratch resistance, adhesion.

INDUSTRIAL APPLICABILITY

The inorganic oxide microparticles of the present invention can suppress aggregation during mixing the inorganic oxide microparticles with a matrix component such as a resin. A composition for film formation containing the inorganic oxide microparticles of the present invention and the matrix component such as a resin can provide a cured film and an optical member that have excellent transparency and high refractive index, scratch resistance, heat resistance, and weather resistance. An optical member having a film formed from the composition for film formation of the present invention can be used for not only a lens for glasses but also a lens for a camera, a window glass for an automobile, and an optical filter provided in a liquid crystal display, a plasma display and the like.

The invention claimed is:

1. Inorganic oxide microparticles in which an amphiphilic organosilicon compound having one or more polyoxyalkylene groups selected from a polyoxyethylene group, a polyoxypropylene group, or a polyoxybutylene group as a hydrophilic group, and one or more selected from a $C_{1-18}$ alkylene group or a vinylene group as a hydrophobic group is bonded to a surface of modified metal oxide colloidal particles (C) having a primary particle diameter of 2 to 100 nm, the modified metal oxide colloidal particles in which a surface of metal oxide colloidal particles (A) having a primary particle diameter of 2 to 60 nm as a nucleus is coated with a coating material (B) including metal oxide colloidal particles having a primary particle diameter of 1 to 4 nm.

2. The inorganic oxide microparticles according to claim 1, wherein the amphiphilic organosilicon compound contains 3 to 40 repeating oxyalkylene units of the hydrophilic group in one molecule thereof.

3. The inorganic oxide microparticles according to claim 1, wherein the amount of the amphiphilic organosilicon compound is 0.1 to 30% by mass relative to the total amount of metal oxides of the modified metal oxide colloidal particles (C).

4. The inorganic oxide microparticles according to claim 1, wherein the metal oxide colloidal particles (A) include colloidal particles of oxide of at least one metal selected from the group consisting of Ti, Fe, Cu, Zn, Y, Zr, Nb, Mo, In, Sn, Sb, Ta, W, Pb, Bi, and Ce.

5. The inorganic oxide microparticles according to claim 1, wherein the coating material (B) includes colloidal particles of oxide of at least one metal selected from the group consisting of Si, Al, Sn, Zr, Mo, Sb, and W.

6. An organic solvent dispersion comprising the inorganic oxide microparticles according to claim 1.

7. A composition for film formation comprising the inorganic oxide microparticles according to claim 1, and one or more of an organosilicon compound of the following Formula (M):

$$R^1{}_aR^2{}_bSi(OR^3)_{4-(a+b)} \quad (M)$$

(wherein $R^1$ is a $C_{1-6}$ hydrocarbon group or an organic group having a vinyl group, a methacryloxy group, an acryloxy group, a mercapto group, an amino group, an ureido group, or an epoxy group, $R^2$ is a $C_{1-10}$ hydrocarbon group different from $R^1$, $R^3$ is a $C_{1-8}$ hydrocarbon group or an acyl group, and a and b are 0 or 1), and a hydrolysate and/or a partial condensation of the organosilicon compound.

8. A composition for film formation comprising the inorganic oxide microparticles according to claim 1, and one or more selected from a thermosetting resin, a thermoplastic resin, or an ultraviolet-curing resin.

9. A member comprising a cured film of the composition for film formation according to claim 7 on a surface of a substrate.

10. The member according to claim 9, further comprising an anti-reflective coating on a surface thereof.